US008142284B2

(12) United States Patent
McInerny et al.

(10) Patent No.: US 8,142,284 B2
(45) Date of Patent: Mar. 27, 2012

(54) METHOD AND APPARATUS FOR SELECTING AND ANIMATING GAME ELEMENTS IN A GAMING MACHINE

(75) Inventors: Paul A. McInerny, Los Angeles, CA (US); Alfred Thomas, Las Vegas, NV (US); Benjamin Gomez, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1616 days.

(21) Appl. No.: 11/154,269

(22) Filed: Jun. 16, 2005

(65) Prior Publication Data

US 2006/0025194 A1 Feb. 2, 2006

Related U.S. Application Data

(60) Provisional application No. 60/581,323, filed on Jun. 19, 2004.

(51) Int. Cl.
*A63F 9/24* (2006.01)
*A63F 13/00* (2006.01)
*G06F 17/00* (2006.01)
*G06F 19/00* (2011.01)

(52) U.S. Cl. ............... 463/31; 463/20; 463/16; 715/738

(58) Field of Classification Search ................ 463/1-49; 273/138.1-309
See application file for complete search history.

(56) References Cited

U.S. PATENT DOCUMENTS

| | | | | |
|---|---|---|---|---|
| 5,807,174 A * | 9/1998 | Fukuhara et al. | ............... | 463/31 |
| 6,254,481 B1 * | 7/2001 | Jaffe | ............................. | 463/20 |
| 6,319,124 B1 * | 11/2001 | Baerlocher et al. | ............. | 463/20 |
| 2002/0151349 A1 * | 10/2002 | Joshi | .............................. | 463/20 |
| 2003/0022711 A1 * | 1/2003 | Locke et al. | .................... | 463/16 |
| 2003/0100357 A1 * | 5/2003 | Walker et al. | .................. | 463/16 |
| 2003/0130025 A1 * | 7/2003 | Gilmore et al. | ................ | 463/16 |
| 2008/0040671 A1 * | 2/2008 | Reed | ............................ | 715/738 |

* cited by examiner

*Primary Examiner* — Paul A D'Agostino
(74) *Attorney, Agent, or Firm* — Schwegman, Lundberg & Woessner, P.A.

(57) ABSTRACT

A method and apparatus for selecting game elements in a gaming machine are described herein. In one embodiment, the method includes presenting a bonus event setting that includes a plurality of game elements and receiving a plurality of game element selections. In the method, each game element selection indicates that one of the game elements has been selected. Additionally, the method also includes presenting an animation sequence for each of the game element selections, wherein portions of the animation sequences are presented simultaneously.

3 Claims, 12 Drawing Sheets

METHOD AND APPARATUS FOR SELECTING AND ANIMATING GAME ELEMENTS IN A GAMING MACHINE

RELATED APPLICATION

This application claims priority under 35 U.S.C. 119(e) from U.S. Provisional Application Ser. No. 60/581,323, filed Jun. 19, 2004, the contents of which are incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to the field of gaming machines and more particularly to animating game elements in a gaming machine.

BACKGROUND

As gaming machines evolve, they continue to provide new and entertaining ways of presenting gaming content. One conventional way of increasing the entertainment value of casino-style video games, such as video slots, video poker, video black jack, and the like, is to offer a base game and bonus events. A base game includes all game events that contribute to determining and/or indicating the game's primary outcome. For example, in a video slot machine game, the base game includes spinning and stopping the reels to indicate the game's primary outcome.

A bonus event includes one or more game events triggered from the base game. The outcomes of these bonus events are determined and displayed differently than primary outcomes of the base game. These bonus outcomes are determined by either random selection by the gaming machine, or by a combination of player input and random selection by the gaming machine.

One disadvantage of many prior art gaming machines is that players quickly become disinterested in repetitive bonus event content. Another disadvantage of many prior art gaming machines is that they present lengthy bonus events that distract players from base games and diminish the playing experience.

SUMMARY

A method and apparatus for selecting game elements in a gaming machine are described herein. In one embodiment, the method includes presenting a bonus event setting that includes a plurality of game elements and receiving a plurality of game element selections. In the method, each game element selection indicates that one of the game elements has been selected. Additionally, the method also includes presenting an animation sequence for each of the game element selections, wherein portions of the animation sequences are presented simultaneously.

In one embodiment, the apparatus includes a display unit to present a plurality of game elements. The apparatus also includes a gaming control unit to receive a plurality of game element selections, wherein each game element selection indicates that a certain one of the game elements has been selected. The gaming control unit also presents animation sequences for each game element selection, where some of the animation sequences are presented in parallel.

BRIEF DESCRIPTION OF THE FIGURES

The present invention is illustrated by way of example and not limitation in the Figures of the accompanying drawings in which.

DESCRIPTION OF THE EMBODIMENTS

A method and apparatus for animating game elements in a gaming machine are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase “exemplary embodiment” means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams may depict serial operations, certain embodiments could perform certain of those operations in parallel.

This description of the embodiments is divided into four sections. In the first section, a system level overview is presented. In the second section, methods for using exemplary operations are described. In the third section, an exemplary gaming machine is described.

System-Level Overview

This section also describes an exemplary system architecture for embodiments of the invention.

Figure 1:
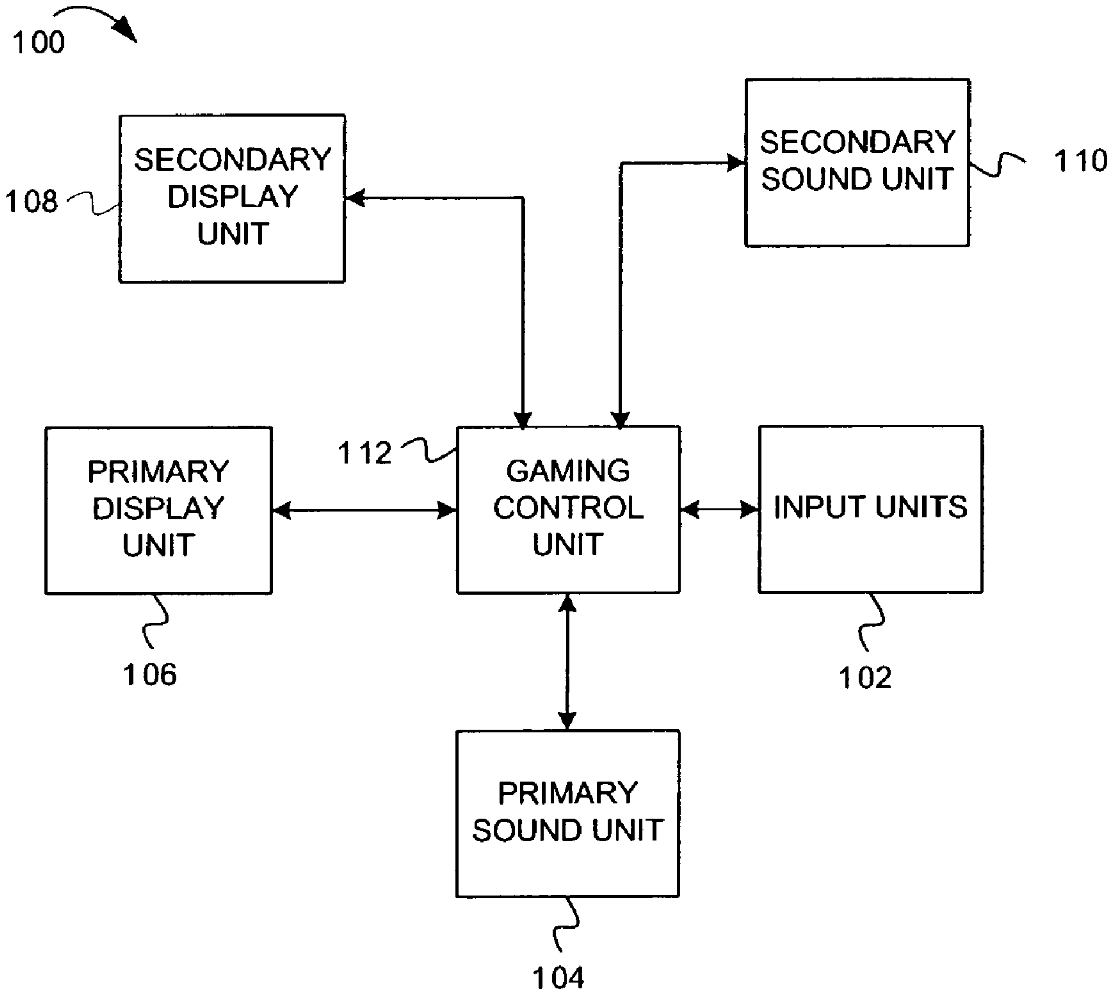
FIG. 1 shows a block diagram of a system 100 for processing game scenes in a gaming machine.

FIG. 1 shows a block diagram of a system 100 for processing game scenes in a gaming machine. Operations of the system components are described in the following section.

The system 100 includes one or more input units 102, which are connected to a gaming control unit 112. The input units 102 can be buttons, knobs, switches, voice-recognition devices, touchscreen display buttons, trackballs, or any other suitable input devices. The gaming control unit 112 includes logic (not shown) for conducting a casino game such as video poker, video slots, video blackjack, keyno, video roulette, or any other suitable casino style game. In particular, the gaming control unit 112 includes logic for processing graphics and audio for presentation via audio and video output devices. According to embodiments, the gaming control unit 112 can include queues, stacks, or other data structures necessary for performing the functionality described herein. Moreover, the gaming control unit 112 can divided into any number of suitable elements, which can be communicatively coupled using any suitable communication method (message passing, parameter passing, signals, etc.). The gaming control unit 112 and any other component of system 100 can include machine-readable media including instructions for performing operations described herein. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc. According to embodiments of the invention, the components of the system 100 can include other various types of logic (e.g., digital logic) for processing game scenes on a gaming machine, as described herein.

The gaming control unit 112 is connected to a primary sound unit 104 and a secondary sound unit 110. The primary and secondary sound units can be speakers or other suitable sound projection devices. The primary and secondary sound units receive audio output data from the gaming control unit 112 and present the audio output data to players and onlookers.

The gaming control unit 112 is also connected to a primary display unit 106 and a secondary display unit 108. The primary and secondary display units can be cathode ray tubes (CRT), liquid crystal displays (LCD), projection displays, plasma screens, projection LCDs, or any other suitable video presentation device. The primary and secondary display units can be touchscreen devices capable of receiving player input. The primary and secondary display units receive video presentation data from the gaming control unit 112 and display that data to players and onlookers.

While the system 100 includes both primary and secondary sound and display units, alternative embodiments include additional display and sound units. However, other embodiments include only one display unit and one sound unit. As noted above, the operations of the components of the system 100 will be described in greater detail below.

Exemplary Operations

Figure 2:
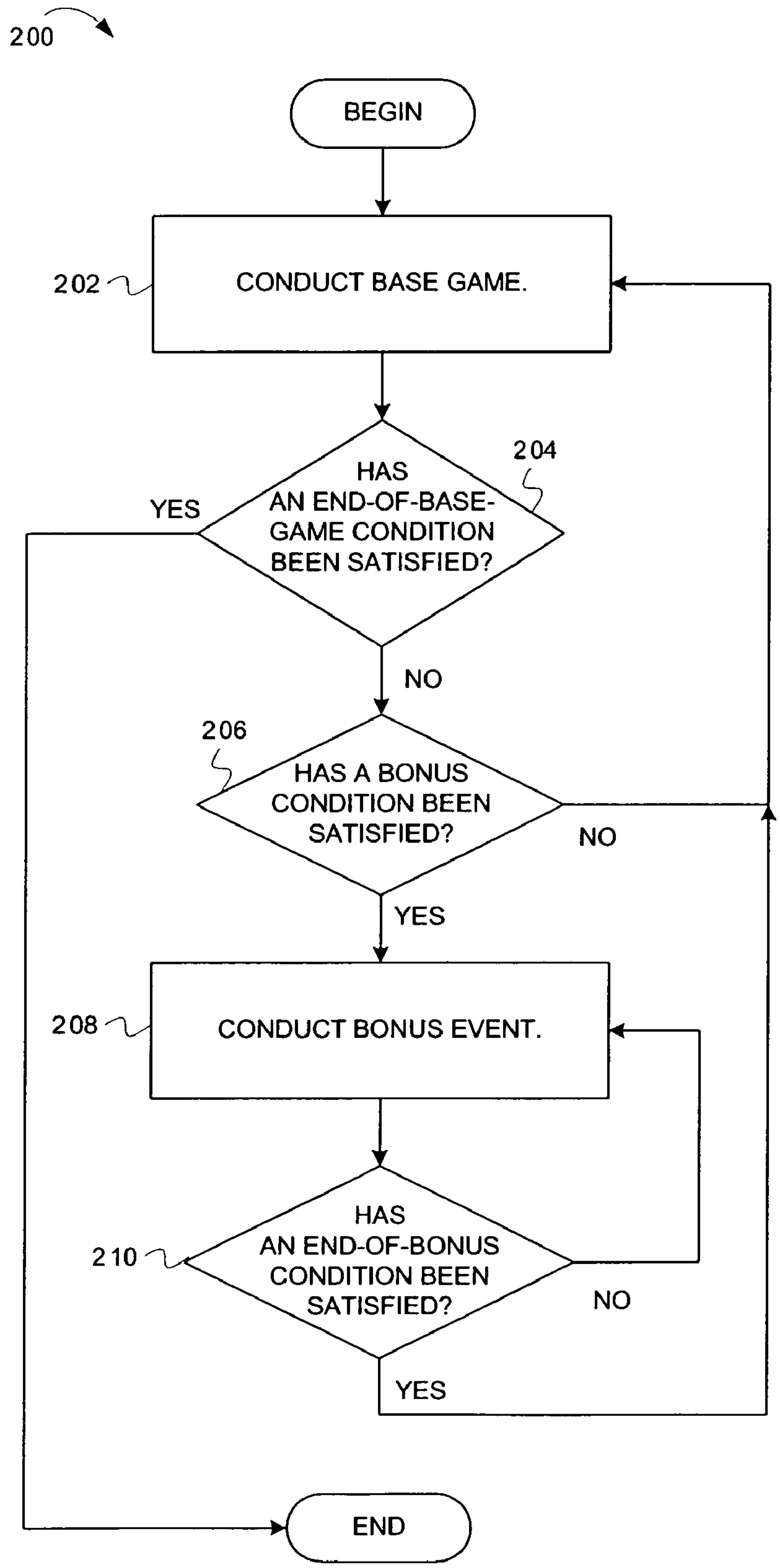
FIG. 2 is a flow diagram illustrating operations for conducting a base game and bonus event, according to exemplary embodiments of the invention.

This section describes exemplary operations of the system 100 (described above). FIGS. 2 describes general operations for conducting a base game and bonus event, while FIGS. 3 and 9 describe operations for animating game elements in a gaming machine. FIGS. 4-8 show animation sequences for the game elements.

FIG. 2 is a flow diagram illustrating operations for conducting a base game and bonus event, according to exemplary embodiments of the invention. The flow diagram 200 will be described with reference to the system 100 of FIG. 1. The flow diagram 200 commences at block 202.

At block 202, a base game is conducted. For example, the gaming control unit 112 conducts a base game. The base game can be video poker, video slots, video blackjack, keyno, video roulette, or any other suitable casino style game. The flow continues at block 204.

At block 204, a determination is made about whether an end-of-base-game condition has been satisfied. For example, the gaming control unit 112 determines whether an end-of-base-game condition has been satisfied. The end-of-base-game condition can be any game condition that indicates the base game is over. For example, in a video slot machine, an end-of-base-game condition can be satisfied after a non-winning reel-spin. A winning reel-spin can also satisfy an end-of-base-game condition. In alternative embodiments, where the base game is not video slots, the end-of-base-game condition can be satisfied in any suitable fashion. If an end-of-base-game condition has been satisfied, the flow ends. Otherwise, the flow continues at block 206.

At block 206, a determination is made about whether a bonus condition has been satisfied. For example, the gaming control unit 112 determines whether a bonus condition has been satisfied. In a video slot machine game, a bonus condition can be satisfied when a predetermined real combination results from a reel spin. If a bonus condition has been satisfied, the flow continues at block 208. Otherwise, the flow continues at block 202.

At block 208, a bonus event is conducted. For example, the gaming control unit 112 conducts bonus event. The bonus event can include one or more additional reel spins, a random selection game, or any other suitable game. The flow continues at block 210.

At block 210, a determination is made about whether an end-of-bonus condition has been satisfied. For example, the gaming control unit 112 determines whether an end-of-bonus condition has been satisfied. For example, in a game-of-chance bonus event, an end-of-bonus condition can be satisfied when a player selects a predetermined game element from several game elements presented in a bonus setting. After the player selects the predetermined game element, the end-of-bonus condition is satisfied. If the end-of-bonus condition has been satisfied, the flow continues at block 202. Otherwise, the flow continues at block 208.

Figure 3:
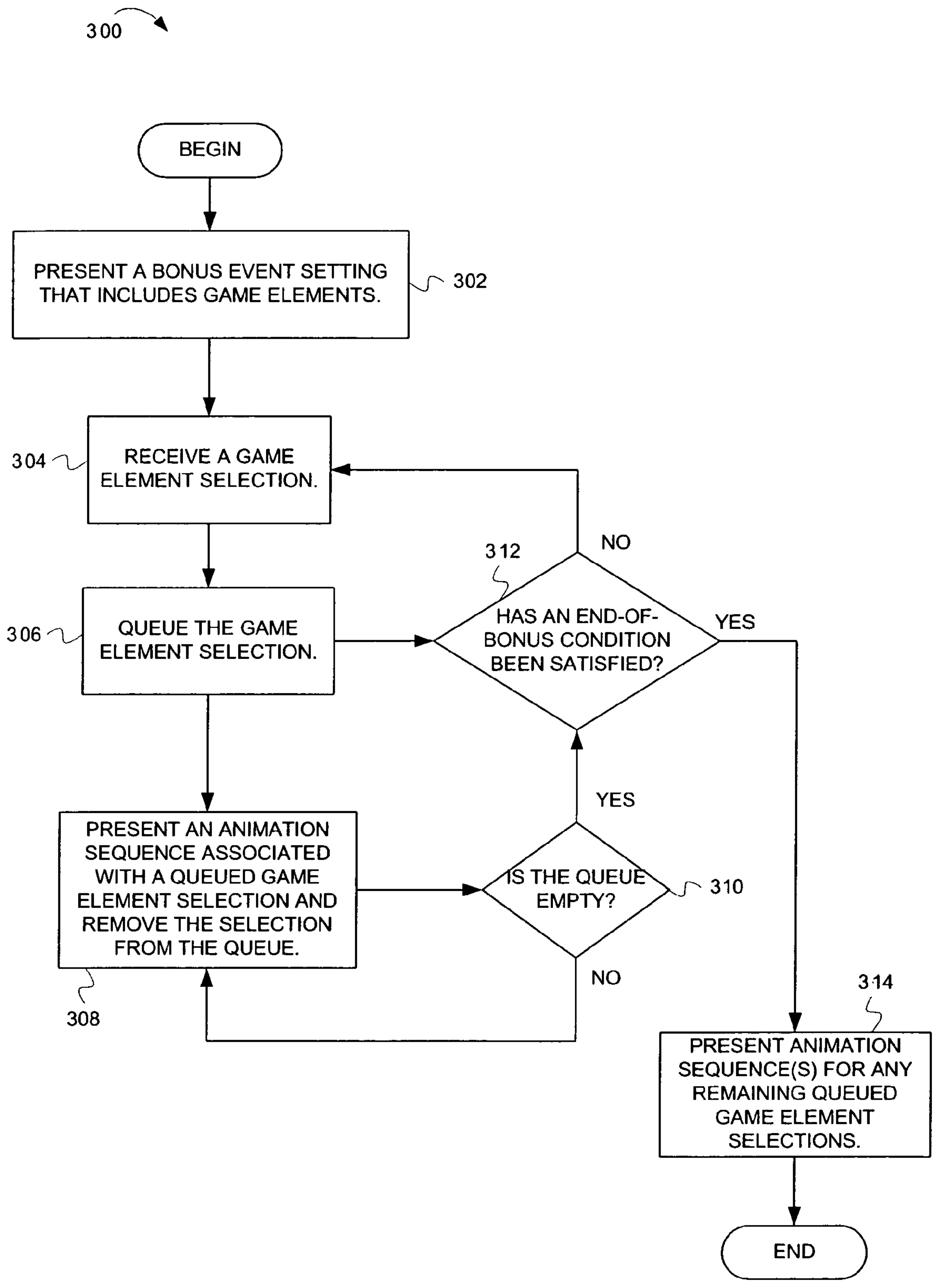
FIG. 3 is a flow diagram illustrating operations for receiving game element selections and animating game elements in a bonus event, according to exemplary embodiments of the invention.

While FIG. 2 describes general operations for conducting the base game and bonus event, FIG. 3 describes operations for conducting a bonus event in which game elements are animated. FIGS. 4-8 are screenshots describing the game element animations.

FIG. 3 is a flow diagram illustrating operations for receiving game element selections and animating game elements in a bonus event, according to exemplary embodiments of the invention. The flow diagram 300 will be described with reference to the system 100 of FIG. 1. The flow diagram 300 commences at block 302.

Figure 4:
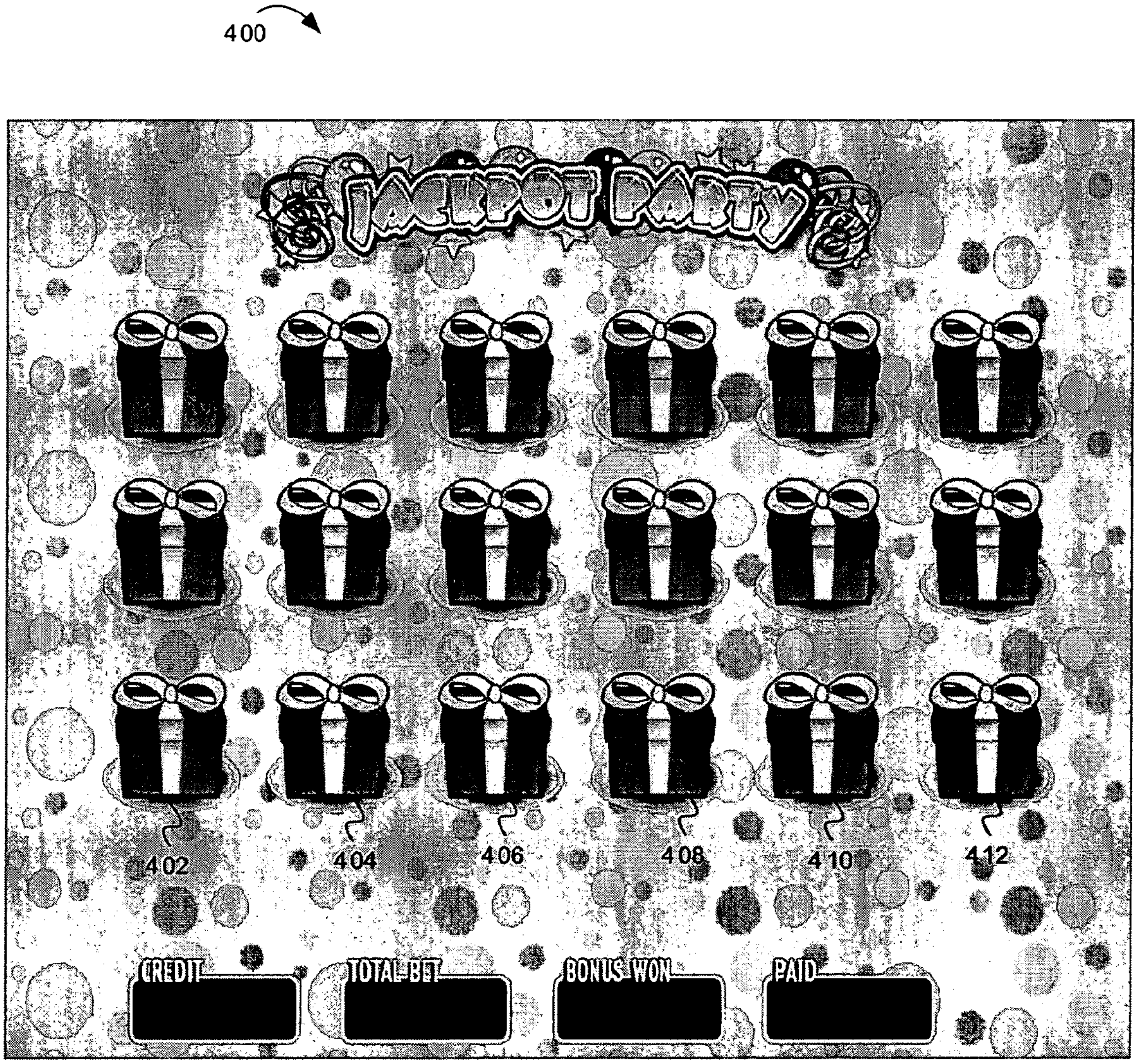
FIG. 4 is a bonus event setting that includes a number of game elements, according to exemplary embodiments of the invention.

At block 302, a bonus event setting that includes game elements is presented. For example, the gaming control unit 112 presents a bonus event setting on the secondary display unit 108. Alternatively, the gaming control unit 112 can present the bonus event setting on the primary display unit 106. In addition to presenting the bonus event setting, the gaming control unit 112 can also present bonus event sound effects on the primary and/or secondary sound units. The game elements can be icons or other graphical images. The game elements can represent slot machine reels, playing cards, coins, tokens, numbers, numbers on a roulette wheel, or other indicia used for playing a bonus event. FIG. 4 is a bonus event setting that includes a number of game elements, according to exemplary embodiments of the invention. As shown in FIG. 4, a bonus event setting 400 includes a number of game elements. In FIG. 4, certain of the game elements represent gift-wrapped boxes. The gift-wrapped boxes are arranged in a matrix of three rows and six columns. The game elements of the bottom row are shown as game elements 402, 404, 406, 408, 410, and 412. The bonus event setting 400 will be discussed in greater detail vis-à-vis the operations of the flow diagram 300. Referring back to FIG. 3, the flow continues at block 304.

Figure 5:
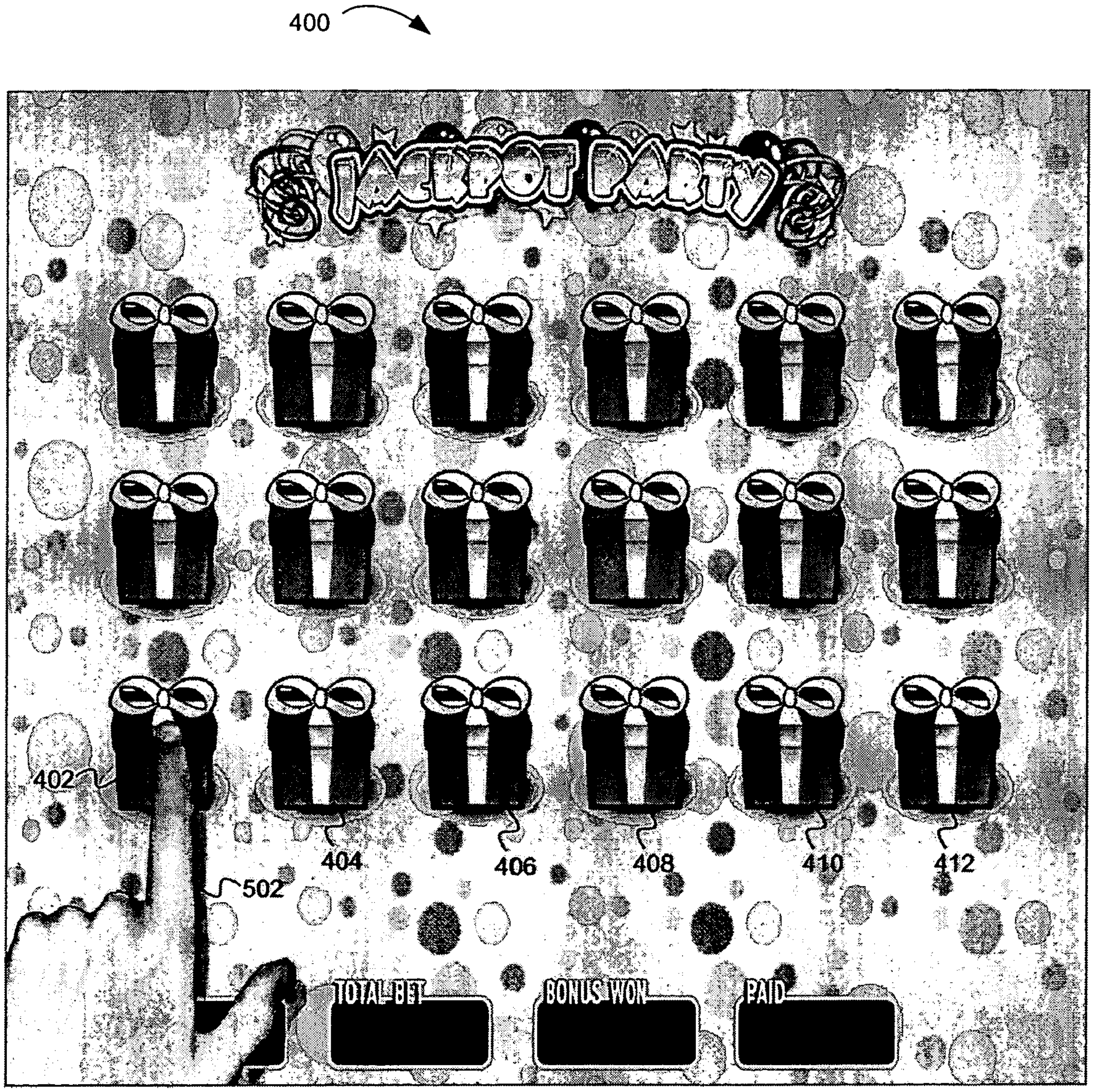
FIG. 5 illustrates a player selecting a game element on a touchscreen, according to exemplary embodiments of the invention.
Figure 6:
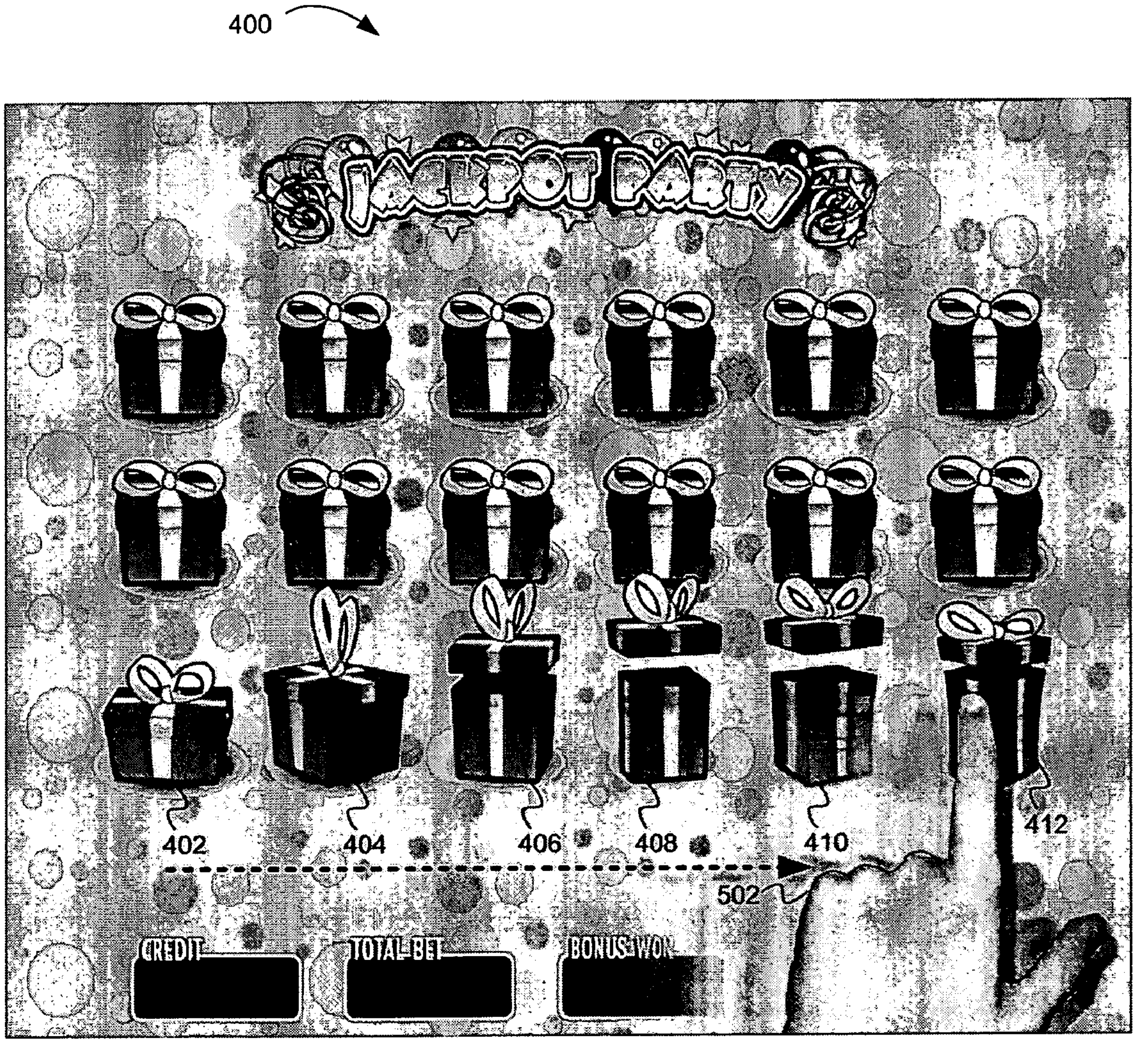
FIG. 6 illustrates a technique for quickly selecting several game elements, according to exemplary embodiments of the invention.

At block 304, a game element selection is received. For example, the gaming control unit 112 receives a game element selection from the input units 102. As noted above, the input units 102 can include a touchscreen. In one embodiment, a player can select a game element by pressing a portion of a touchscreen that overlays a game element to be selected. FIG. 5 illustrates a player selecting a game element on a touchscreen, according to exemplary embodiments of the invention. As shown in FIG. 5, a player 502 selects the game element 402 of the bonus event setting 400 by pressing the portion of the touchscreen that overlays the game element 402. Similarly, a player can quickly select several game elements by using a sweeping motion to press portions of the touchscreen that overlay several game elements. FIG. 6 illustrates a technique for quickly selecting several game elements, according to exemplary embodiments of the invention. FIG. 6 shows the player 502 using a sweeping motion to press portions of the touchscreen that overlay the game elements 402, 404, 406, 408, 410, and 412. As a result of the sweeping motion, the player 502 has selected the game elements 402, 404, 406, 408, 410, and 412. In order to facilitate fast play and reduce the time necessary for conducting bonus events, embodiments of the gaming control unit 112 are equipped to quickly receive and process many game element selections. In certain embodiments, when the gaming control unit 112 receives multiple game element selections in a short time period, the gaming control unit 112 can animate multiple game elements in parallel, as described below. Referring back to FIG. 3, the flow continues at block 306.

At block 306, the game element selection is queued. For example, the gaming control unit 112 stores the game element selection in a queue. The flow continues in parallel at blocks 312 and 308.

At block 308, an animation sequence associated with a queued game element selection is presented and the game element selection is removed from the queue. For example, the gaming control unit 112 presents on the primary display unit 106 and/or the secondary display unit 108 an animation sequence associated with a queued game element selection.

FIG. 6 shows a snapshot of animation sequences for game elements of a bonus event. In particular, in FIG. 6, the animation sequence for the game element 404 shows the game element's bow rising into the air. The animation sequences for the game elements 406, 408, 410, and 412 show their box tops rising into the air. In the full animation, the entire graphical manipulation of the game elements and any accompanying audio content is presented.

Figure 7:
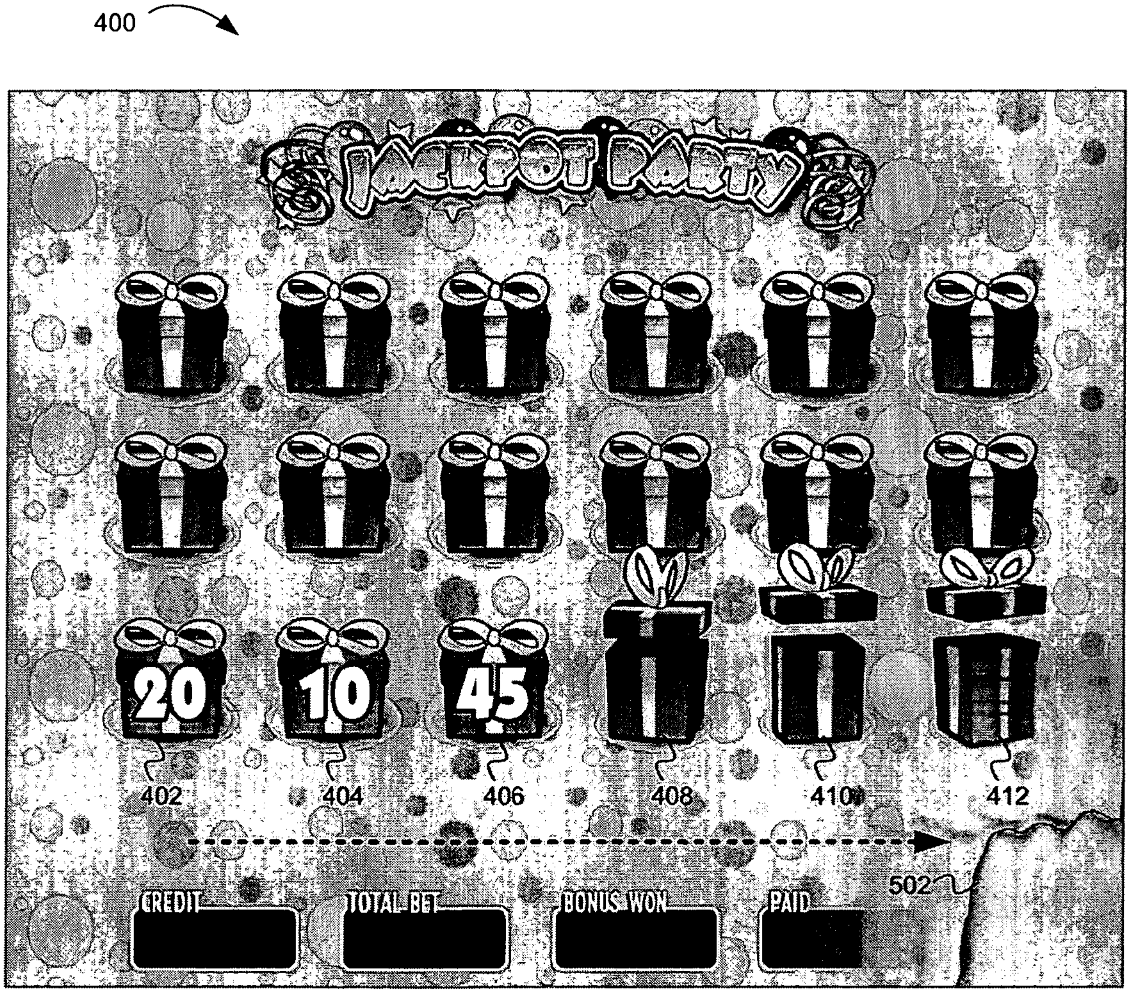
FIG. 7 is another snapshot of the animation sequences for game elements of a bonus event, according to alternative embodiments of the invention.
Figure 8:
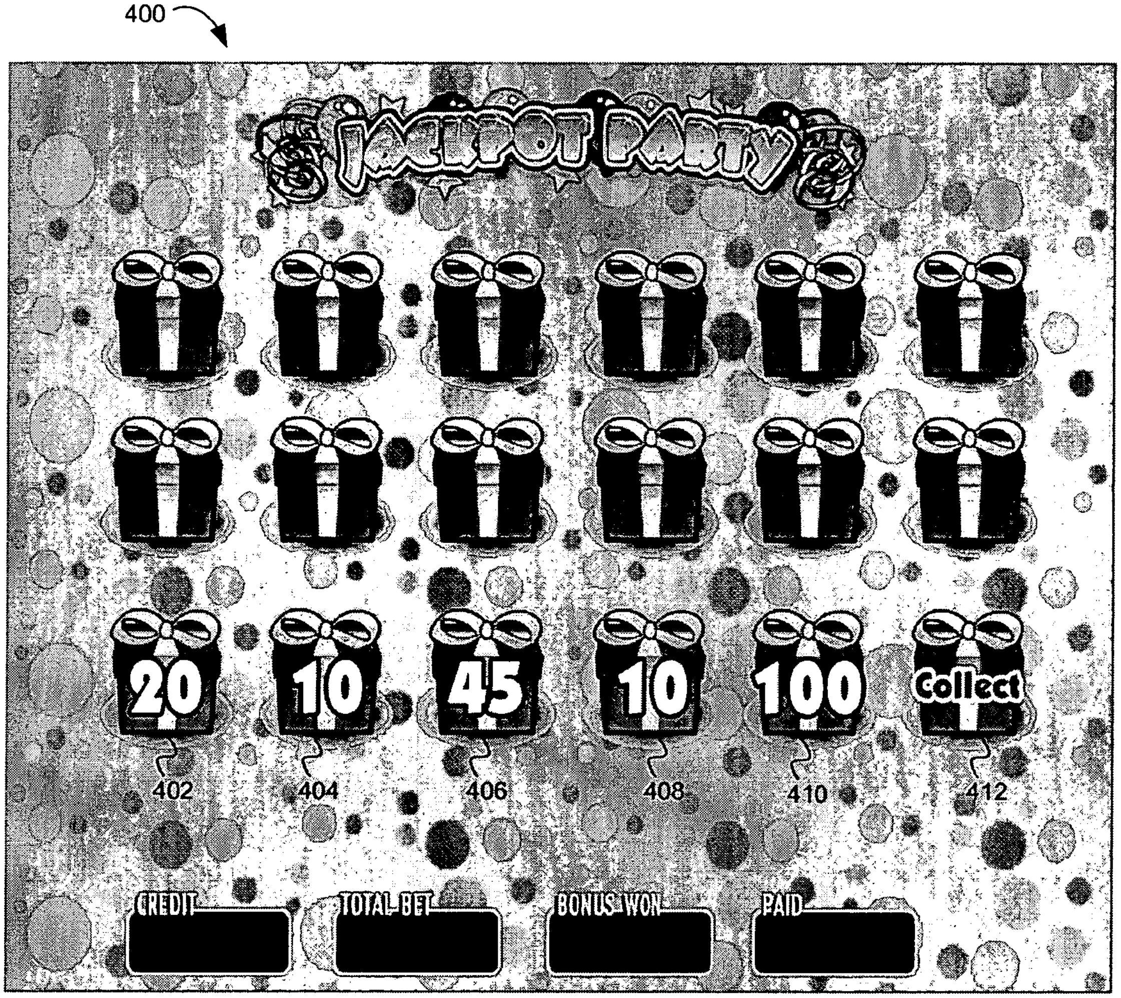
FIG. 8 is yet another snapshot of the animation sequences for game elements of a bonus event, according to alternative embodiments of the invention.

FIGS. 7 and 8 show later phases of the animation sequences shown in FIG. 6. FIG. 7 is another snapshot of the animation sequences for game elements of a bonus event, according to alternative embodiments of the invention. In FIG. 7, the animation sequences for the game elements 402, 404, 406 show bonus values associated with each of the respective game elements. That is, the bonus value "20" is shown as part of the game element 402, while the bonus values "10" and "40" are shown as bonus values for the game elements 404 and 406, respectively. FIG. 8 is yet another snapshot of the animation sequences for game elements of a bonus event, according to alternative embodiments of the invention. In FIG. 8, bonus values are shown for game elements 408 and 410, while an end-of-bonus indicator is shown for the game element 412. In particular, the word "collect" appears in the animation for the game element 412. In one embodiment, when "collect" appears in a game element animation sequence, an end-of-bonus condition is satisfied. Satisfaction of the end-of-bonus condition signifies the end of a bonus event. Alternative embodiments call for other suitable animation sequences and end-of-bonus event indicators.

Referring back to FIG. 3, after presenting the animation sequence, the gaming control unit 112 removes the game element selection from the queue. The process continues at block 310.

At block 310, a determination is made about whether the queue is empty. For example, the gaming control unit 112 determines whether it's queue is empty. If the gaming control unit queue is empty, the flow continues at block 312. Otherwise, the flow continues at block 308.

At block 312, a determination is made about whether an end-of-bonus condition has been satisfied. For example, the gaming control unit 112 determines whether an end-of-bonus condition has been satisfied. In one embodiment, the gaming control unit 112 determines whether a player has selected a predetermined game element that is part of a bonus event setting. If the player has selected the predetermined game element, the end-of-bonus event is satisfied. If the end-of-bonus condition has been satisfied, the flow continues at block 314. Otherwise, the flow continues at block 304.

At block 314, animation sequences for any remaining queued game element selections are presented. For example, the gaming control unit 112 presents on the primary and/or secondary display unit animation sequences for any remaining queued game element selections. From block 314, the flow ends.

Figure 9:
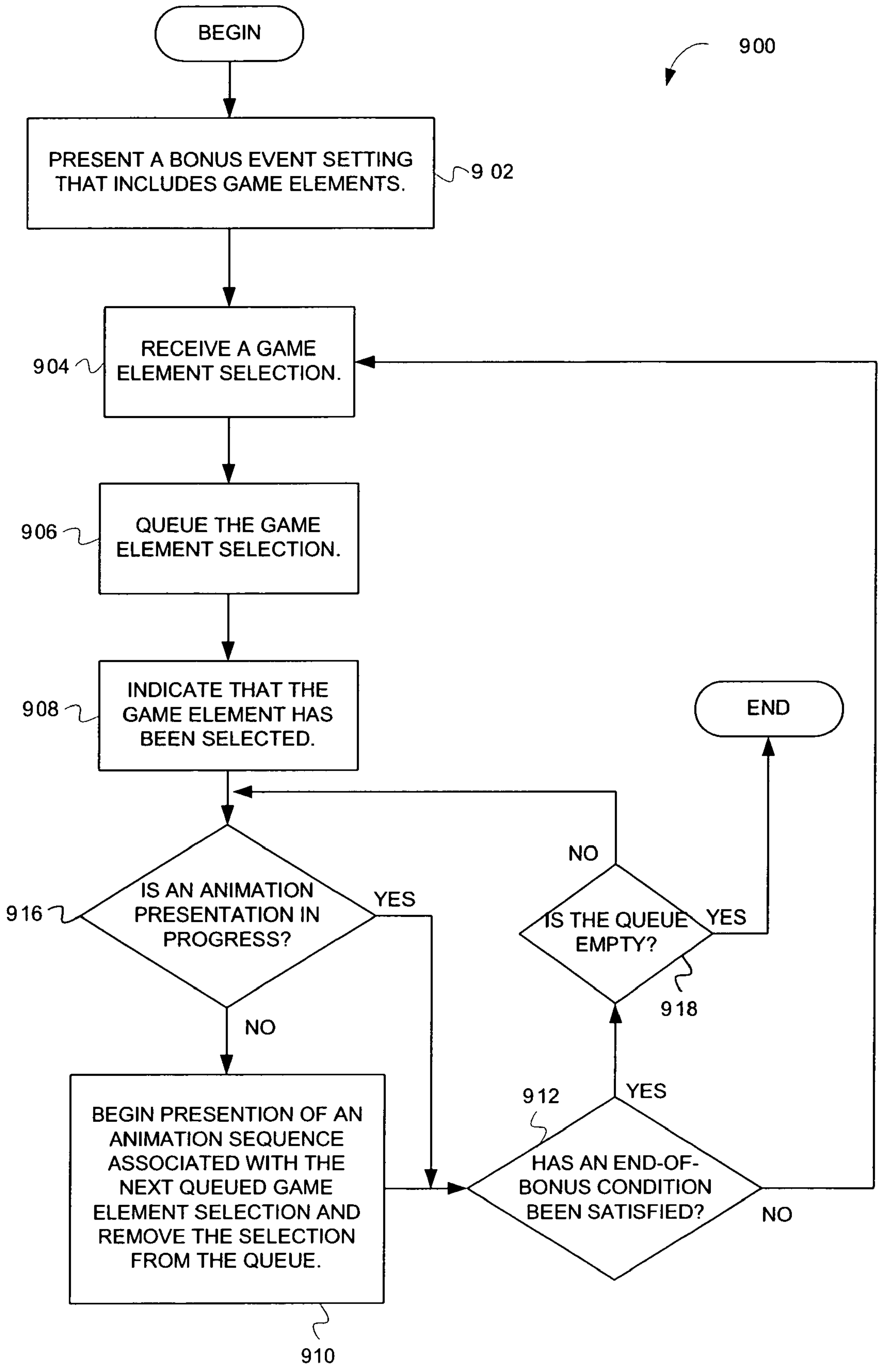
FIG. 9 is a flow diagram illustrating operations for receiving game element selections and animating game elements, according to exemplary embodiments of the invention.

While FIGS. 3-8 have described operations and animations for conducting a bonus event, FIG. 9 provides an alternative method for animating selected game elements during a bonus event. In the method described in FIG. 9, after a game element is selected, the game element is marked to indicate that the game element selection has been received. Additionally, if multiple game element selections are received, animation sequences for each of the selected game elements are sequentially presented.

FIG. 9 is a flow diagram illustrating operations for receiving game element selections and animating game elements, according to exemplary embodiments of the invention. The flow diagram 900 will be described with reference to the exemplary system 100 of FIG. 1. The flow diagram 900 commences at block 902.

At block 902, a bonus event setting that includes game elements is presented. For example, the gaming control unit 112 presents a bonus event setting that includes game elements. The flow continues at block 904.

At block 904, a game element selection is received. For example the gaming control unit 112 receives a game element selection from the input unit 102, which receives and processes a player's game element selection. The flow continues at block 906.

At block 906, the game element selection is queued. For example, the gaming control unit 112 stores the game element selection in a queue. The flow continues at block 908.

At block 908, an indication is made that the game element has been selected. For example, the gaming control unit 112 indicates that the game element has been selected. In one embodiment, the gaming control unit 112 highlights the selected game element in a conspicuous color (e.g., red, yellow, etc.) and presents the highlighted game element on the primary and/or secondary display unit. In alternative embodiments, the gaming control unit 112 uses alternative methods for indicating that the game element has been selected, such as resizing, blinking, or otherwise graphically manipulating the selected game element.

At block 916, a determination is made about whether an animation presentation is in progress. For example, the gaming control unit 112 determines whether it is currently presenting an animation sequence for a selected game element. If an animation presentation is in progress, the flow continues at block 912. Otherwise, the flow continues at block 918.

At block 910, an animation sequence associated with the next queued game element selection is begun and the game element selection is removed from the queue. For example, the gaming control unit 112 begins presentation of an animation sequence associated with the next queued game element selection. After beginning the presentation, the gaming control unit 112 removes the game element selection from the queue. The flow continues at block 912.

At block 912, a determination is made about whether an end-of-bonus condition has been satisfied. For example, the gaming control unit 112 determines whether an end-of-bonus condition has been satisfied. If an end-of-bonus condition has been satisfied, the flow continues at block 918. Otherwise, the flow continues at block 904.

At block 918, a determination is made about whether the queue is empty. If the queue is empty, the flow ends. Otherwise, the flow continues at block 916.

Figure 10:
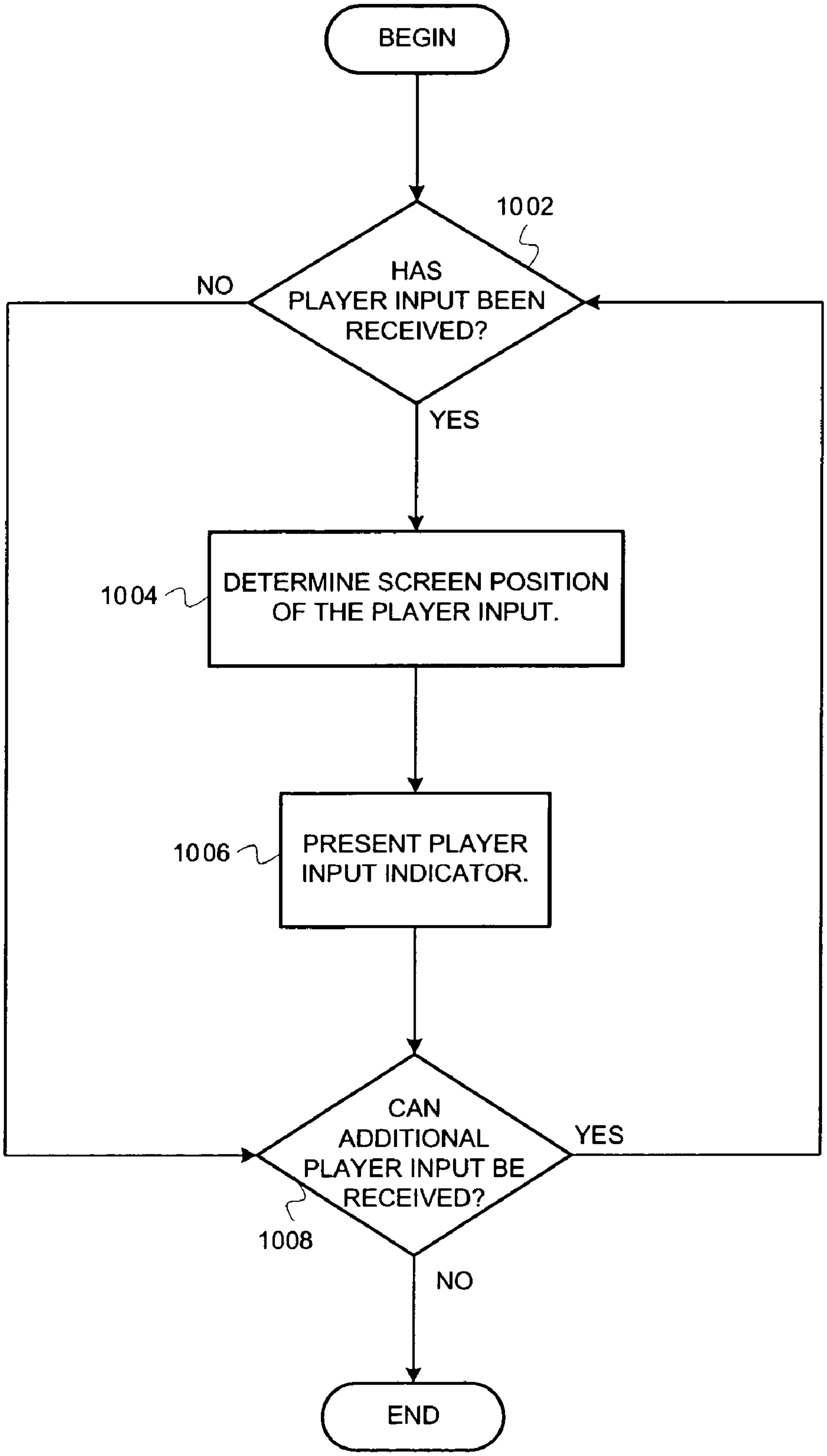
FIG. 10 is a perspective view of a gaming device, according to exemplary embodiments of the invention.
Figure 11:
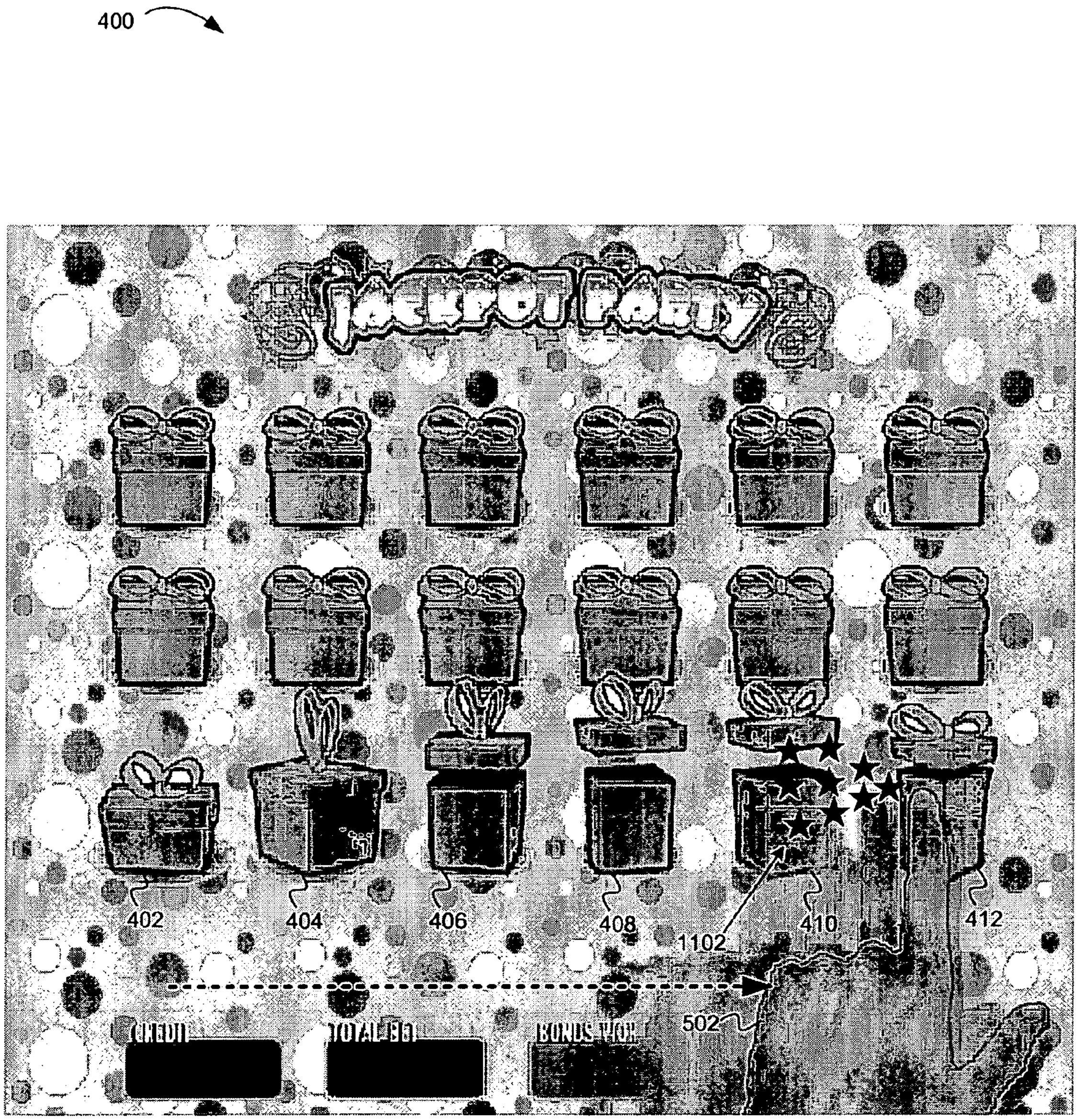
FIG. 11 is a screenshot illustrating a player input indicator used in conjunction with embodiments of the invention.

Thus far, the discussion has primarily described techniques for processing game element selections and animating game elements. The discussion will now describe a technique for processing player input. The following technique for processing player input can be used in concert with the techniques for selecting and animating game elements described above. FIGS. 10 describes operations for processing player input, while FIG. 11 shows a screenshot of a game that uses the player input processing technique.

FIG. 10 is a flow diagram illustrating operations for processing player input, according to exemplary embodiments of the invention. The flow diagram 1000 will be described with reference to the exemplary system 100 of FIG. 1. The flow diagram 1000 begins at block 1002.

At block 1002, a determination is made about whether player input has been received. For example, the gaming control unit 112 determines whether it has received player input from the input units 102. The player input can include input received from a player through a touchscreen, mouse, or pointing device. The flow continues at block 1004.

At block 1004, a screen position of the player input is determined. For example, the gaming control unit 112 determines a position on the primary display unit 106 at which the player input was entered. A screen position can be represented by a pair of coordinates (x,y) which indicate a pixel position on a primary or secondary display unit. The flow continues at block 1006.

At block 1006, a player input indicator is presented. For example, the gaming control unit 112 presents a player input indicator on the primary display unit 106. In one embodiment, the player input indicator is presented close to or at the screen position at which the player input was received. In one embodiment, the player input indicator can be a graphical effect such as a graphically simulated steam of confetti. According to embodiments, the player input indicator can be represented by any suitable graphical effect such as lightening bolts, a light trail, or group of stars. FIG. 11 is a screenshot illustrating a player input indicator used in conjunction with embodiments of the invention. As shown in FIG. 11, as the player 502 enters player input, the gaming control unit 112 presents the player input indicator 1102 wherever player input was received. In the embodiment illustrated in FIG. 11, the player input indicator 1102 is a group of stars. If the player 502 were to drag his hand across the screen selecting several game elements, the gaming control unit 112 would present a player input indicators 1102 (e.g., the group of stars) at positions at which the player input was received. In one embodiment, the player input indicator is superimposed over game elements. In one embodiment, after a player input indicator is presented, it soon disappears.

In an alternative embodiment, the player input indicator can be an audio effect, such as a song snippet, sound of clanking coins, etc. In yet another alternative embodiment, the player input indicator can be a combination of audio and graphical effects. Referring back to FIG. 10, the flow continues at block 1008.

At block 1008, a determination is made about whether additional player input can be received. For example, the gaming control unit 112 determines whether additional player input can be received through the input units 102. Additional input cannot be received after an end-of-bonus or end condition has been satisfied. If additional input can be received, the flow continues at block 1002. Otherwise, the flow ends.

Exemplary Gaming Machine

Figure 12:
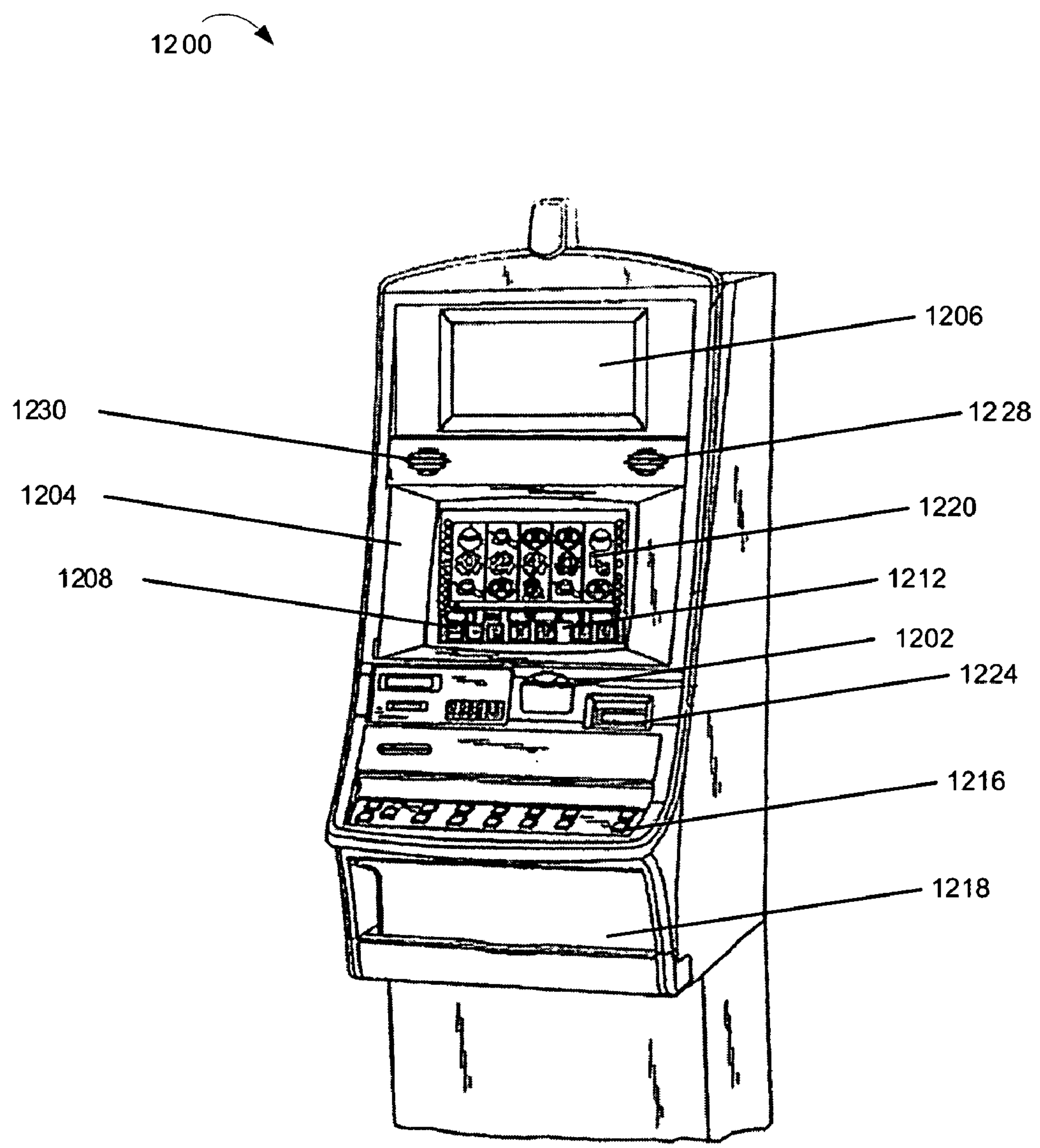
FIG. 12 is a perspective view of a gaming device, according to exemplary embodiments of the invention.

FIG. 12 is a perspective view of a gaming device, according to exemplary embodiments of the invention. As shown in FIG. 12, the gaming device 1200 can be a slot machine having the controls, displays, and features of a conventional slot machine. The gaming device 1200 can be operated while players are standing or seated. Additionally, the gaming device 1200 is preferably mounted on a console. However, it should be appreciated that the gaming device 1200 can be constructed as a pub-style tabletop game (not shown), which a player can operate while sitting. Furthermore, the gaming device 1200 can be constructed with varying cabinet and display designs. The gaming device 1200 can incorporate any primary game such as slot, poker, or keno, and additional bonus round games. The symbols and indicia used on and in the gaming device 1200 can take mechanical, electrical or video form.

As illustrated in FIG. 12, the gaming device 1200 includes a coin slot 1202 and bill acceptor 1224. Players can place coins in the coin slot 1202 and paper money or ticket vouchers in the bill acceptor 1224. Other devices can be used for accepting payment. For example, credit/debit card readers/validators can be used for accepting payment. Additionally, the gaming device 1200 can perform electronic funds transfers and financial transfers to procure monies from house financial accounts. When a player inserts money in the gaming device 1200, a number of credits corresponding to the amount deposited is shown in a credit display. After depositing the appropriate amount of money, a player can begin playing the game by pushing play button 1208. The play button 1208 can be any play activator used by the player to start a game or sequence of events in the gaming device 1200.

As shown in FIG. 12, the gaming device 1200 also includes a bet display 1212 and a "bet one" button 1216. The player places a bet by pushing the bet one button 1216. The player can increase the bet by one credit each time the player pushes the bet one button 1216. When the player pushes the bet one button 1216, the number of credits shown in the credit display 1206 decreases by one, and the number of credits shown in the bet display 1212 increases by one.

A player may "cash out" by pressing a cash out button. When a player cashes out, the gaming device 1200 dispenses a number of coins, corresponding to the number of remaining credits, into the coin tray 1218. The gaming device 1200 may employ other payout mechanisms such as credit slips, which are redeemable by a cashier, or electronically recordable cards, which track player credits.

The gaming device 1200 also includes one or more display devices. The embodiment shown in FIG. 12 includes a primary display unit 1204 and a secondary display unit 1206. In one embodiment, the primary display unit 1204 displays a plurality of reels 1220. In one embodiment, the gaming device displays three reels, while an alternative embodiment displays five reels. In one embodiment, the reels are in video form. According to embodiments of the invention, the display units can display any visual representation or exhibition, including moving physical objects (e.g., mechanical reels and wheels), dynamic lighting, and video images. In one embodiment, each reel 1220 includes a plurality of symbols such as bells, hearts, fruits, numbers, letters, bars or other images, which correspond to a theme associated with the gaming device 1200. Furthermore, as shown in FIG. 12, the gaming device 1200 includes a primary sound unit 1228 and a secondary sound unit 1230. In one embodiment, the primary and secondary sound units include speakers or other suitable sound projection devices. The gaming device 1200 can be adapted to include the system 100. Additionally, the gaming device 1200 is capable of performing the operations for processing game settings described herein.

Thus, a method and apparatus for selecting and animating game elements in a gaming machine have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:

presenting a bonus event setting that includes a plurality of game elements, wherein the plurality of game elements is presented on a secondary display unit;

receiving a plurality of successive game element selections, wherein each of the successive game element selections indicates that one of the presented game elements has been selected;

queuing the plurality of successive game element selections; and presenting an animation sequence including a plurality of animation portions in response to each of the successive game element selections, wherein a first animation portion of the animation sequence in response to one of the successive game element selections is presented simultaneously to a second animation portion of the animation sequence in response to another of the successive game element selections, the second animation portion being different from the first animation portion.

2. A method comprising:

presenting a plurality of game elements wherein the plurality of game elements is presented on a secondary display unit;

receiving a first selection of a first game element of the plurality of game elements;

animating the first game element of the plurality of game elements in a game element animation in response to the first selection, the game element animation including a plurality of animation parts;

receiving a second selection of a second game element of the plurality of game elements, the second selection being received successively to the first selection while the first game element is animating; and animating the second game element of the plurality of game elements in the game element animation in response to the second selection, wherein a first part of the plurality of animation parts of the game element animation in response to the first selection is animated simultaneously with a second part of the plurality of animation parts of the game element animation in response to the second selection, the second part being different from the first part, and wherein the first selection and the second selection are queued and acted upon based on their position in the queue.

3. A method comprising:

presenting a bonus event setting that includes a plurality of game elements;

receiving a plurality of successive game element selections, wherein each of the successive game element selections indicates that a certain one of the presented game elements has been selected;

storing the plurality of received successive game element selections in a queue;

presenting a first set of animation sequences including a first animation sequence and a second animation sequence using the queue, each of the first animation sequence and the second animation sequence including a plurality of animation portions, wherein a first animation portion of the first animation sequence in response to one of the successive game element selections is presented simultaneously to a second animation portion of the second animation sequence in response to another of the successive game element selections, the second animation portion being different from the first animation portion, wherein the first set of animation sequences and the second set of animation sequences are presented on a secondary display device;

determining whether an end-of-bonus event condition has occurred; and presenting a second set of animation sequences after determining an end-of-bonus event condition has occurred, the second set of animation sequences including a third animation sequence and a fourth animation sequence, each of the third animation sequence and the fourth animation sequence including a plurality of animation portions, wherein a first animation portion of the third animation sequence in response to one of the successive game element selections is presented simultaneously to a second animation portion of the fourth animation sequence in response to another of the successive game element selections, the first animation portion being different from the second animation portion.

* * * * *

UNITED STATES PATENT AND TRADEMARK OFFICE

CERTIFICATE OF CORRECTION

PATENT NO. : 8,142,284 B2
APPLICATION NO. : 11/154269
DATED : March 27, 2012
INVENTOR(S) : Paul A. McInerny et al.

It is certified that error appears in the above-identified patent and that said Letters Patent is hereby corrected as shown below:

IN THE DRAWINGS:

On Sheet 9 of 12, Box. 910, Figure 9, line 1, delete "PRESENTION" and insert -- PRESENTATION --, therefor.

IN THE SPECIFICATIONS:

In column 8, lines 33-34, delete "lightening" and insert -- lightning --, therefor.

Signed and Sealed this
Twenty-sixth Day of June, 2012

David J. Kappos
*Director of the United States Patent and Trademark Office*